United States Patent
Dubois et al.

(10) Patent No.: US 8,690,324 B2
(45) Date of Patent: Apr. 8, 2014

(54) METHOD FOR MODIFYING SPECTACLE FRAME SHAPE DATA

(75) Inventors: Frédéric Dubois, Charenton-le-Pont (FR); David Freson, Charenton-le-Pont (FR)

(73) Assignee: Essilor International (Compagnie Generale d'Optique, Charenton le Pont (FR)

(*) Notice: Subject to any disclaimer, the term of this patent is extended or adjusted under 35 U.S.C. 154(b) by 845 days.

(21) Appl. No.: 12/811,091

(22) PCT Filed: Dec. 23, 2008

(86) PCT No.: PCT/EP2008/068277
§ 371 (c)(1),
(2), (4) Date: Jun. 28, 2010

(87) PCT Pub. No.: WO2009/065967
PCT Pub. Date: May 28, 2009

(65) Prior Publication Data
US 2010/0293069 A1    Nov. 18, 2010

(30) Foreign Application Priority Data
Dec. 28, 2007 (EP) .................................. 07301757

(51) Int. Cl.
*G02C 5/00* (2006.01)
*G02C 7/02* (2006.01)
(52) U.S. Cl.
USPC .................. 351/178; 351/159.73; 351/159.74

(58) Field of Classification Search
USPC ............... 351/83, 159.73, 159.75, 159.76, 351/159.77, 178; 33/200
See application file for complete search history.

(56) References Cited

U.S. PATENT DOCUMENTS

| | | | |
|---|---|---|---|
| 4,991,305 A * | 2/1991 | Saigo et al. | 33/507 |
| 5,333,412 A | 8/1994 | Matsuyama | |
| 5,450,335 A * | 9/1995 | Kikuchi | 702/168 |
| 5,926,247 A * | 7/1999 | Kimura | 351/41 |
| 6,122,063 A | 9/2000 | Berndt et al. | |
| 2001/0035933 A1 | 11/2001 | Iwai et al. | |
| 2005/0251280 A1* | 11/2005 | Shibata | 700/117 |
| 2008/0192200 A1* | 8/2008 | Iribarne | 351/177 |

FOREIGN PATENT DOCUMENTS

| | | |
|---|---|---|
| EP | 0 576 268 | 12/1993 |
| EP | 0 583 915 | 2/1994 |

* cited by examiner

*Primary Examiner* — Evelyn A Lester
*Assistant Examiner* — William Alexander
(74) *Attorney, Agent, or Firm* — Cozen O'Connor

(57) ABSTRACT

A method for modifying spectacle frame shape data, comprising the steps of: generating spectacle frame data by measuring the shape of a rim of a spectacle frame with a spectacle frame shape measuring apparatus, determining the principal axes of inertia of the measured shape of the rim of the spectacle frame using the rim spectacle frame data, and calculating new spectacle rim frame data expressed in the principal axes of inertia of the measured shape of the rim of the spectacle frame.

11 Claims, 3 Drawing Sheets

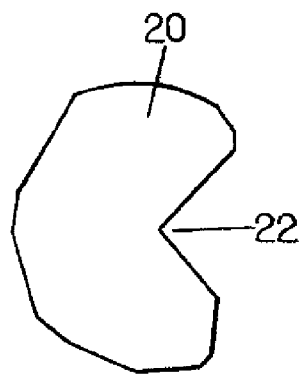
FIG.2a.
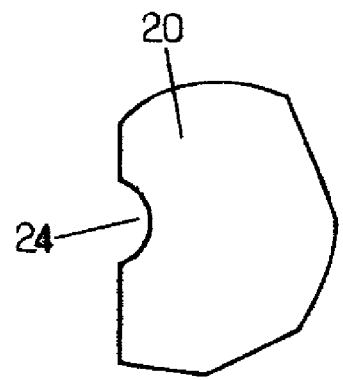
FIG.2b.
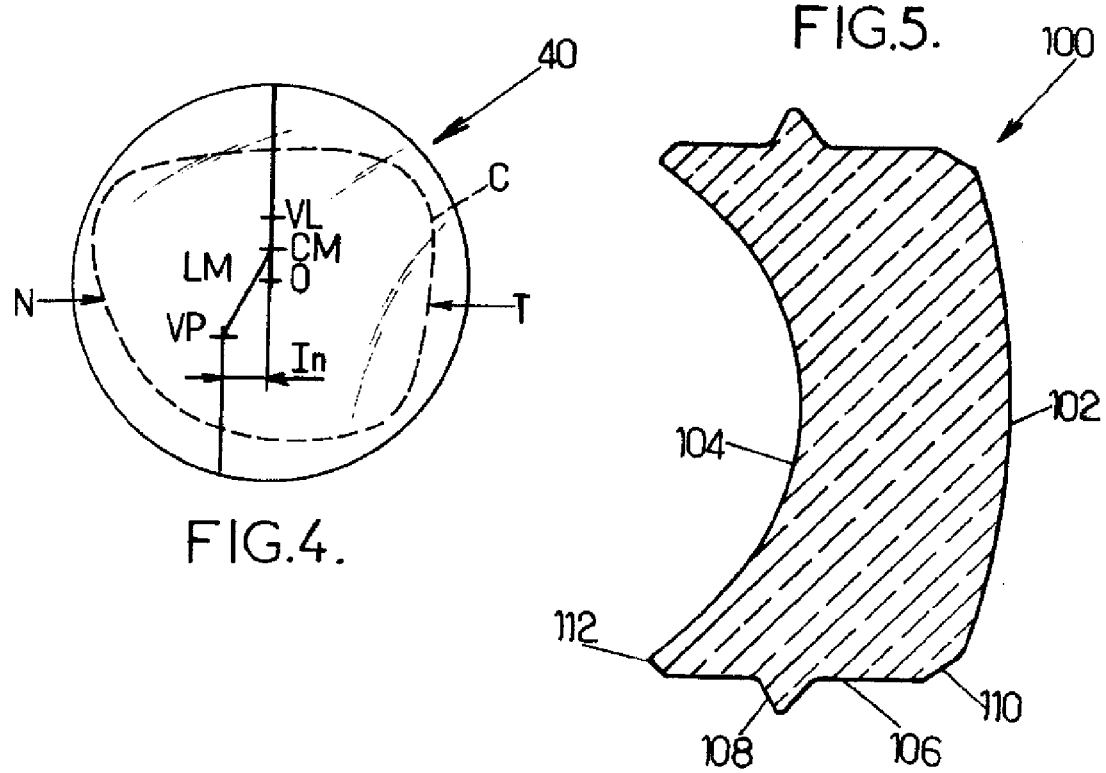
FIG.4.
FIG.5.

METHOD FOR MODIFYING SPECTACLE FRAME SHAPE DATA

RELATED APPLICATIONS

This is a U.S. national stage of application No. PCT/EP2008/068277, filed on Dec. 23, 2008.

This application claims the priority of European application no. 07301757.6 filed Dec. 28, 2007, the entire content of which is hereby incorporated by reference.

FIELD OF THE INVENTION

The invention relates to a method for modifying spectacle frame shape data.

BACKGROUND OF THE INVENTION

Usually, a person needing to wear spectacles and having thus a prescription filled by an ophthalmologist goes to the premise of an optician for choosing the frame of the future spectacles. The future wearer of the spectacles may try several spectacle frames and finally chooses one of the tried frames. The optician orders a pair of lenses corresponding to the prescription. The lenses sent to the optician have been designed and manufactured according to optical criteria.

Depending on the service provided by the lens manufacturer, the optician may have to cut the lenses to the fit the spectacle frame the person has chosen or in case of "remote edging" service the optician receives the lenses already cut and only has to fit them in the spectacle frame.

The inner circumference of the openings of the chosen spectacle frame (e.g. the openings of the frame where ophthalmic lenses are intended to be mounted) can be measured very precisely by a measuring device, for example a mechanical sensor. More particularly, the openings of the frame include an inner groove and the characteristics of the groove (tilt angle with the openings, depth of the groove, etc.) can be measured by the mechanical sensor in a measuring room. U.S. Pat. No. 5,121,548 describes such a measuring device and method.

The measurements performed by the mechanical sensor on the chosen spectacle frame make it possible to order ophthalmic lenses which fit the chosen spectacle frame, on the one hand, and the wearer prescription, on the other hand.

According to the measurements performed by the mechanical sensor in the measuring room, the optician or the provider of ophthalmic lenses are able to:
- determine the best semi-finished lenses for the wearer according to optical criteria, for example the wearer prescription;
- edge and bevel the lenses to fit with the measurements performed on the chosen spectacle frame.

In the sense of the invention a step of cutting the lenses according to a spectacle frame shape is called "edging" and a step of forming a bevel on an external edged of the lens is called "beveling."

The lenses provider has to ensure that the provided lenses are adapted to the wearer prescription and to the chosen spectacle frame.

For example, the lenses provider has to ensure that the future lenses can effectively fit the chosen frame which may have particular openings and groove.

It will be thus understood that the measurements performed on the inner circumference openings of the chosen frame and the choice of the semi-finished lens are of great importance for the lens provider.

Usually the lens provider will provide the optician with a measuring device. The measuring device of the lens provider is calibrated in a known way by the provider. Usually, if the optician wishes to measure the frame with a measuring device other than the one provided by the lens provider, the lens provider may not be able to use the shape data.

As illustrated in FIG. 6, the digitization of the same frame on measuring devices of different brands and/or models does not give the same result.

As a consequence the optician that wishes to order lenses from different lens provider has to be equipped with as many measuring devices as lens provider he wishes to order from.

SUMMARY OF THE INVENTION

One object of the present invention is to improve the situation.

To this end, one aspect of the present invention is directed to a method for modifying spectacle frame shape data, comprising the steps of:
- generating spectacle frame data by measuring the shape of a spectacle frame with a spectacle frame shape measuring apparatus,
- determining the principal axes of inertia of the measured shape of the spectacle frame using the spectacle frame data,
- calculating new spectacle frame data expressed in the principal axes of inertia of the measured shape of the spectacle frame.

Advantageously, applying such method to the measured shape of a spectacle lens using any measuring device gives the same result. Indeed, expressing the spectacle frame shape in the principal axes of inertia allows having the spectacle frame shape independent of the measuring device.

According to further embodiments which can be considered alone or in combination:
- after the step of calculating the principal axes of inertia, it further comprises a step of rotating the X and Y axis of the principal axes of inertia around the Z axis of an angle θ,
  - Z being the axe perpendicular to the average plane of the measured shape of the spectacle frame and $$\text{Arctg}\left(\frac{X_y}{X_x}\right) - 1 \le \theta \le \text{Arctg}\left(\frac{X_y}{X_x}\right) + 1$$

with
  - $X_x$ the projection of the axe X of the principal axe of inertia on the x axe of the axe of the measuring apparatus,
  - $X_y$ the projection of the axe X of the principal axe of inertia on the y axe of the axe of the measuring apparatus;
- between the step of generating spectacle frame data and the step of calculating the principal axes of inertia, the method further comprises a step of sending the spectacle frame data to a spectacle lens manufacturer side using an ordering terminal;
- between the step of generating spectacle lens data and the step of calculating the principal axes of inertia, the further comprises a step of sending identification data of the spectacle frame shape measuring apparatus to a spectacle lens manufacturer side using an ordering terminal;
- the spectacle frame data comprises three dimensional data or two dimensional coordinates obtained by projecting the three-dimensional shape of the lens frame onto a plane and parameter values defining a curved surface approximate to the three-dimensional frame shape;

the step of expressing said measured shape in its principal axes of inertia is replaced by the step of expressing said measured shape in the corrected axes of inertia;

The method further comprises the step of calculating a correction function according to said spectacle frame shape measuring apparatus;

the correction function is calculated according to the geometry of the measurement element of said apparatus, for example the form and/or dimension of the measurement element of said apparatus;

after the step of calculating a correction function, it further comprises the step of correcting said measured shape using said correction function;

According to another aspect, the invention relates to an ophthalmic lens manufacturing method comprising the steps of:

receiving a ophthalmic lens, determining the shape of a given spectacle frame using a method according to the invention, determining the shape of the bevel of the ophthalmic lens so as to have the ophthalmic lens fit in the spectacle frame, cutting the ophthalmic lens according to the calculated bevel.

According to further embodiments which can be considered alone or in combination:

the spectacle frame is selected and measured at a lens order side and the internal profile of the groove of the spectacle lens is transmitted to a computing device installed at a lens edger side where the calculation steps are processed, the cutting step is preceded at the order side.

The invention also relates to an ophthalmic lens ordering method comprising the steps of:

selecting a spectacle frame, ordering an ophthalmic lens cut according to the invention, fitting the cut ophthalmic lens in the selected spectacle frame.

According to another aspect, the invention relates to a computer program product comprising one or more stored sequence of instruction that is accessible to a processor and which, when executed by the processor, causes the processor to carry out at least one of the steps of at least one of the method according to the invention.

The invention also relates to a computer readable medium carrying one or more sequences of instructions of the computer program according to the invention.

Unless specifically stated otherwise, the cross-section of a rim of a spectacle frame is to be understood as according to a plane comprising the barycentric center of the rim of the spectacle frame.

Unless specifically stated otherwise, the cross-section of an ophthalmic lens is to be understood as according to a plane comprising the barycentric center of the ophthalmic lens.

Unless specifically stated otherwise, the wording "optician" is to be understood as well as eye care professional.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/ or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings wherein:

FIGS. 2a and 2b are cross-sections of two type of spectacle frames rims;

FIG. 4 represents the contour of a progressive additional lens, before and after edging;

FIG. 5 represents a cross section of an ophthalmic lens edged to fit a closed frame rim;

DETAILED DESCRIPTION OF THE DRAWINGS

Figure 1:
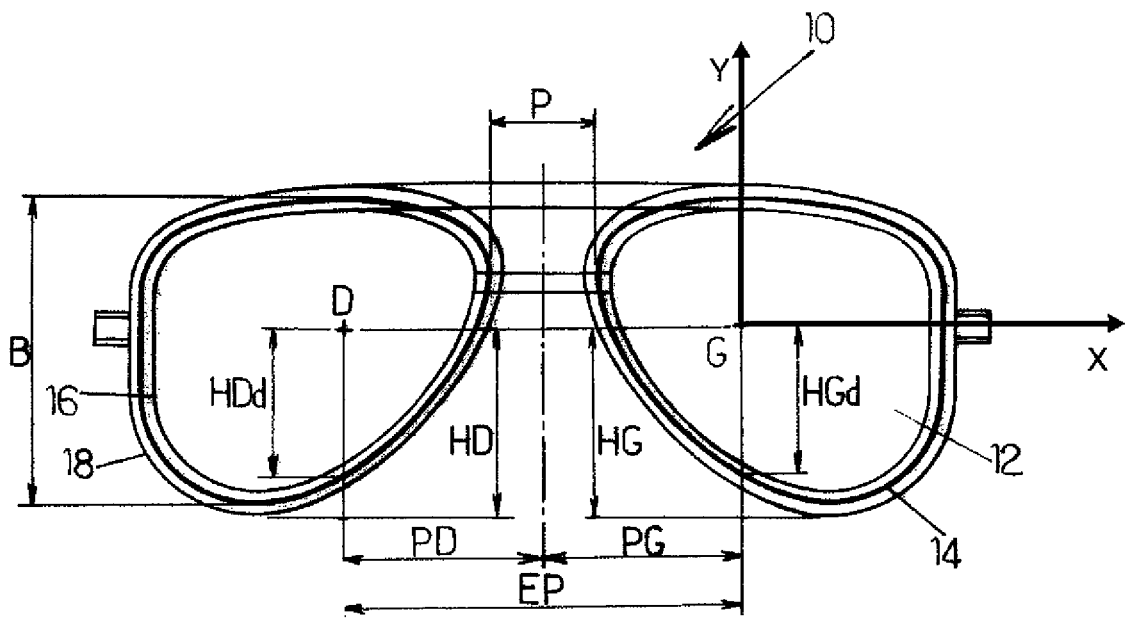
FIG. 1 is the front face of a closed rim spectacle frame.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the framework of the invention, the following terms have the meanings indicated herein below:

optical axis of the addition lens: direction perpendicular to the front face of the lens and passing through the optical centre of the latter;

distance-vision region: region of the lens that surrounds the distance-vision point, and within which the local optical characteristics of optical power and of astigmatism of the lens are substantially identical to those at the distance-vision point;

near-vision region: region of the lens that surrounds the near-vision point, and within which the local optical characteristics of optical power and of astigmatism of the lens are substantially identical to those of the near-vision point;

addition of a progressive lens: difference between the value of optical power of the lens at the near-vision point and that at the distance-vision point;

optical characteristics of a lens: data on optical power, astigmatism, aberration, etc., relating to the modifications of a light beam that passes through the lens;

prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value;

surface characteristics of a lens: geometrical data relating to one face of the lens, such as values of average sphere or of cylinder, for example;

average sphere, denoted D: (N−1) times the half-sum of the inverses of the two radii of curvature of a surface expressed in meter, denoted R1 and R2, and determined at the same point on the latter. In other words: D=(N−1)×(1/R1+1/R2)/2, where N is the index of refraction of the lens, and cylinder, denoted C: (N−1) times the absolute value of the half-difference of the inverses of the two radii of curvature of a surface expressed in meter, determined at the same point on the latter. In other words: C=(N−1)×|1/R1−1/R2|;

"height" is used to define a lens or a lens zone dimension corresponding to a vertical when the sight is horizontal;

"width" is used to define a lens or a lens zone dimension corresponding to a horizontal when the sight is horizontal.

In the framework of the invention, the term "curvature" of an optical surface is the curvature in a zone or at a specific point of said surface. If the surface is spherical, the curvature is constant and can be determined everywhere. If the surface is a single vision aspheric surface, its curvature is usually measured or determined at the optical center. If the surface is a progressive addition surface, its curvature is usually measured or determined at the distance-vision point. The here above mentioned points are preferred but not limiting points where a curvature according to the present invention can be measured or determined.

In the sense of the invention, the final ophthalmic lens may be of any type of known lens, for example uncoloured lens or photochromic lens or solar lens.

In the sense of the invention, the geometrical data include at least contour and shape data.

The contour data may be chosen from, but not limited to, the list comprising:
  3 D perimeter of one of the face of the spectacle frame or of the bottom of the groove,
  the distance in at least one point between the groove bottom and one of the faces of the spectacle frame.

The shape data may be chosen from, but not limited to, the list comprising:
  the tangent at the surface of the front face of the spectacle frame,
  a 3D digital representation of the spectacle frame,
  the average tore, sphere, cylinder of the front face of the spectacle frame,
  the dihedral angle,
  the 3D digital representation of the interior profile of the spectacle frame,
  the tilt angle of the spectacle frame.

According to the invention, the geometrical data can be obtained by measuring a given spectacle frame using a measuring device well known in the art. Advantageously, the accuracy of the geometrical data is improved. Indeed, although the spectacle frames are produced based on a reference frame, small geometrical differences may exist between a given frame and the reference frame.

The geometrical data can also be obtained from a spectacle frame data base. Advantageously such method is less time consuming.

The geometrical data may also be obtained by a combination of measurements and use of a data base.

According to different embodiment of the invention, the geometrical data may comprise, but is not limited to:
  actual contour parameters and a reference shape,
  3 dimensional data of the spectacle frame,
  2 dimensional data of the spectacle frame and curve data of the spectacle frame,
  an internal profile data of the rim of the spectacle frame,
  geometrical data of the front face of the spectacle frame.

According to the invention, the wearer data comprise at least the wearer prescription data, and may also comprise elements chosen from, but not limited to, the list comprising:
  monocular PD,
  fitting point height,
  the pantoscopic angle,
  the choice of an esthetic criteria, for example: "1:1", "1:2", "Front curve tracing".

The "front curve tracing" is a criterion in which the bevel is formed so as to adjoin the front surface of the lens with the front surface of the spectacle frame.

The "1:1" is a criterion in which the bevel is formed on the external edge of the ophthalmic lens at equidistance of the front and rear face of the ophthalmic lens.

The "1:2" is a criterion in which the bevel is formed on the external edge of the ophthalmic lens so as to have the distance between the bevel and the front face of the lens equal to ½ of the distance between the bevel and the rear face of the lens.

According to the invention, the prescription data may include little or no vision correction. For example, when the ophthalmic lens is a solar lens, the prescription may comprise no vision correction.

FIG. 1 shows a representation of a spectacle frame 10 and the position of the right and left pupils of the wearer in the spectacle frame 10, which are respectively referenced D and G.

The figure shows for the frame 10 the contour of the lens in thick lines 14, and in thin lines the internal 16 and external 18 limits of the spectacle frame 10.

An element, made of plastic or another material, the contour of which corresponds to the bottom of the groove of the spectacle frame, is called the template of the spectacle frame. The template is therefore the external shape that the lens must have once cut out in order to fit in the frame spectacle.

The letter B designates the total height of the template determined with the Boxing system, i.e. according to the ISO8624 standard on systems for the measurement of lenses frames. This height corresponds to the height of a rectangle into which the lens fits once it is cut out.

An element connecting the right and left templates of the frame is called the bridge of the spectacle frame, referenced by letter P in FIG. 1.

The right interpupillary half-distance PD and the left interpupillary half-distance PG refer approximately to half of the distance between the two pupils of the wearer. For the fitting of progressive lenses, an optician measures both interpupillary half-distance PD and PG.

The left half-distance, respectively right, is the distance between the vertical axis of symmetry of the frame and the centre of the left pupil, respectively right.

Right boxing height HD, respectively left boxing height HG, refers to the vertical distance between the right pupil, respectively left and the lowest point of the right half-frame, respectively left height.

For the fitting of progressive lenses, the optician may measure the DATUM heights referenced HDd and HGd in FIG. 1. These right and left reference heights are respectively the distances between the right or left pupil and the right or left intersection between a vertical line passing through the pupil and the frame in its lower part.

The measurements of interpupillary distance and of height of the pupil relative to the frame are carried out for a given position of the wearer, namely for the wearer looking at infinity with his head straight.

The features of a given frame can be measured on the frame, using a device known in the art. For example, U.S. Pat. No. 5,333,412 describes a device which makes it possible to measure in 3-dimensions, the shape of the bottom of the groove of the frame. The shape thus determined then makes it possible to calculate the height B.

The features of a frame can also be given directly by the manufacturer according to the model chosen by the wearer.

Using the data thus defined, each lens is cut out such that the fitting cross CM of a PROGRESSIVE LENS is situated in the frame facing the pupil of the corresponding eye, when the wearer looks at infinity with his head straight.

Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

Unless specifically stated otherwise, the method according to the invention may apply to any type of spectacle frame, for example metal frames, plastic frames, combination frames, semi-rimless frames, Nylor frames, rimless.

FIGS. 2a and 2b show cross sections of two different rims of spectacle frames.

The rim 20 on FIG. 2a has a V-shaped groove 22, usually corresponding to metal or plastic closed spectacle frame. The lens to be fitted in such closed spectacle frame is bevelled so as to have a corresponding Λ-shaped bevel (inverse V shape).

The rim 20 on FIG. 2b has a U-shaped groove 24, usually corresponding to semi-rimless spectacle frame. The lens to be fitted in such semi-rimless spectacle frame is beveled so as to have a corresponding U-shaped bevel and then fitted in the spectacle frame using a retaining cord.

Figure 3:
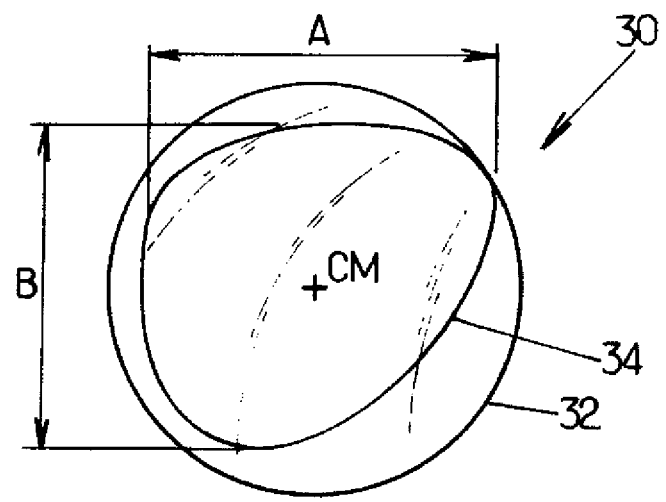
FIG. 3 represents the contour of an ophthalmic lens, before and after edging.
Figure 6:
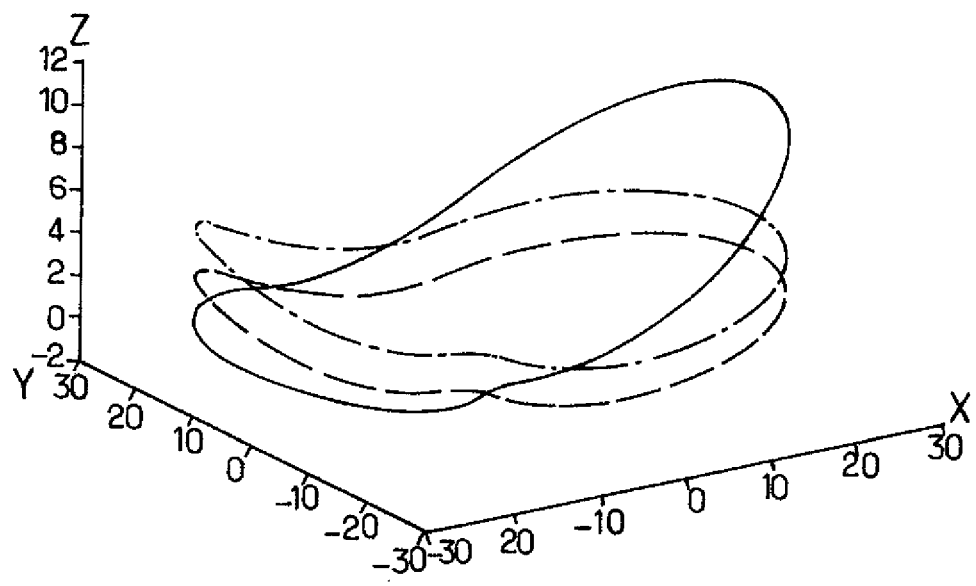
FIGS. 6 and 7 represents measured groove of a rim of a spectacle frame measured using different measuring devices.

FIG. 3 shows a representation of the contour of an ophthalmic lens, before and after edging. In the figure, the thin line corresponds to the contour of the lens before edging; in a standard manner, the lens has a circular shape. The thick line corresponds to the contour of the template of the frame, which is also the contour of the lens after edging the lens. This edging of the lens followed or combined with a beveling step allows the subsequent fitting of the lens in the spectacle frame.

FIG. 3 shows the total width A of the template of the frame and the total height B of this template, i.e. the width and the height of the rectangle into which the cut-out lens fits. As explained above, the positioning of the lens in the frame consists in determining the desired position of the lens in the frame, using positioning data, for example notable points of the lens.

For example, the fitting cross of the lens, the medium of micro-marks marked on the surface of the lens, or also the optical centre in the case of a single vision lens can be used. In FIG. 3, the fitting cross or optical center is marked by the cross referenced CM.

For a lens which does not have a rotational symmetry, it is also necessary to carry out an angular positioning of the lens in the frame.

FIG. 4 shows schematically an addition lens, before the latter has been edged around a contour C to the dimensions of a frame. In the figure, the nasal and temporal sides of the lens, respectively denoted N and T, the meridian line LM, the distance-vision and near-vision points, respectively denoted VL and VP, the inset In, and an prism reference point (PRP) of the lens, denoted O, are indicated.

FIG. 5 shows a cross section of an edged and beveled ophthalmic lens 100. Such ophthalmic lens presents a front face 102, a rear face 104 and an external periphery 106.

The rear face 104 is the face the closest to the eye of the wearer when the ophthalmic lens is fitted on the frame. Usually the rear face 104 is concave and the front face 102 is convex.

The external periphery 106 is preceded during the edging and beveling steps. As represented on FIG. 5 the external periphery presents fitting means, in this case a bevel 108. As discussed previously, the geometry of the bevel, in particular its position and shape, depends on the spectacle frame in which the ophthalmic lens is to be fitted.

Optionally, the external periphery of the lens can present a front face counter bevel 110 and a rear face counter bevel 112.

An embodiment of the method according to the invention is hereafter described.

According to an embodiment of the invention the wearer chose a spectacle frame at the optician side.

The optician measures the chosen spectacle frame using a measuring device as describe for example in U.S. Pat. No. 5,121,548.

The measuring data includes at least the internal profile of the groove of each rim of the spectacle frame.

The matrix of inertia can be calculated with respect to any point for the change of axes according to the invention, for example with respect to the barycentric center or the gravity center of the curve.

According to an embodiment of the invention, the baric centre of the curve is calculated.

With $x(i)$, $y(i)$, $z(i)$ being the coordinates of the points that return the measuring device, for example a measuring device, with reference to the to the centre or the origin of measuring.

The physical expression of the coordinates of the center of gravity are:

$$X_{gc} = \left[\sum_{1}^{n} l(i) * xc(i)\right] / \sum_{1}^{n} l(i)$$

$$Y_{gc} = \left[\sum_{1}^{n} l(i) * yc(i)\right] / \sum_{1}^{n} l(i)$$

$$Z_{gc} = \left[\sum_{1}^{n} l(i) * zc(i)\right] / \sum_{1}^{n} l(i)$$

Wherein l(i) is the length of the index segment i and xc(i), yc(i), zc(i) are the coordinates of the middle of the segment i.

It is noted that the denominator $$\sum_{1}^{n} l(i)$$

represents the perimeter of the curve.

The expressions of xc(i), yc(i), zc(i) are:

$$xc(i)=(x(i)+x(i+1))/2$$

$$yc(i)=(y(i)+y(i+1))/2$$

$$zc(i)=(z(i)+z(i+1))/2;$$

And the length of the index segment i is:

$$l(i) = \sqrt{(x(i+1)-x(i))^2 + (y(i+1)-y(i))^2 + (z(i+1)-z(i))^2}$$

The coordinates of the points read translated to the center of gravity are thus:

$$u(i)=x(i)-X_{gc}$$

$$v(i)=y(i)-Y_{gc}$$

$$w(i)=z(i)-Z_{gc}$$

For a curve composed of n segments in a axes G,u,v,w, we define:

Moment of inertia with respect to the axis u:

$$Igu = \sum_{i=1}^{n} L(i) \cdot du(i)^2$$

Moment of inertia with respect to the axis v:

$$Igv = \sum_{i=1}^{n} L(i) \cdot dv(i)^2$$

Moment of inertia with respect to the axis w:

$$Igw = \sum_{i=1}^{n} L(i) \cdot dw(i)^2$$

In these expressions L(i) represents the length of the index segment I, and du(i), dv(i), dw(i) are the distances from the centre C(i) of the index segment, respectively, to the axes u, v, w whose origins are in G.

Product of inertia with respect to the axis u:

$$Ivw = \sum_{i=1}^{n} L(i) \cdot v(i) \cdot w(i)$$

Product of inertia with respect to the axis v:

$$Iuw = \sum_{i=1}^{n} L(i) \cdot u(i) \cdot w(i)$$

Product of inertia with respect to the axis w:

$$Iuv = \sum_{i=1}^{n} L(i) \cdot v(i) \cdot u(i)$$

u(i), v(i), w(i), being the coordinates of the centre of the index segment i, in the principal axes of inertia (G,u,v,w).

And the matrix of inertia of the spatial curve expressed in the principal axes of inertia (G,u,v,w) is thus:

$$MI(G, u, v, w) = \begin{matrix} Igu & Iuv & Iuw \\ Iuv & Igv & Ivw \\ Iuw & Ivw & Igw \end{matrix},$$

which is a symmetrical matrix, written to simplify $$MI = \begin{matrix} A & F & E \\ F & B & D \\ E & D & C \end{matrix},$$

There is a sole diagonal matrix, depending solely on the geometry of the contour considered called the principal matrix of inertia and calculable directly using the matrix MI by diagonalisation.

Therefore the principal matrix has the form:

$$Mprinc = \begin{matrix} A' & 0 & 0 \\ 0 & B' & 0 \\ 0 & 0 & C' \end{matrix},$$

There is one sole axes system for which this matrix is diagonal. Such axe system comprises the principal axes of inertia.

There is one single associated matrix of passage between the axes of the measuring device considered and the principal axes of the frame.

For an eyeglass frame read there are thus two principal axes of inertia and two matrices of passage per measuring device, one for the right eye and one for the left eye.

In other words, if one reads a frame on two different measuring devices, two different matrices of passage will be obtained but if the matrix of passage associated with device A is applied to the coordinates of the points issued from device A, the same points are obtained as when the matrix of passage associated with device B is applied to the coordinates of points issued from device B. These coordinates are expressed in the unique principal axes of inertia.

According to an embodiment of the invention, the matrix of passage is the matrix of passage of the principal axis towards the measuring device axis, hereafter [cdbm].

That is, for a point p $$(Guvw)\begin{pmatrix} x \\ y \\ z \end{pmatrix}$$

in the measuring device axis (G, u, v, w). Its coordinates in the principal axes of inertia become:

$$p(G, xp, yp, zp) = \begin{pmatrix} xp \\ yp \\ zp \end{pmatrix} = (inv^{[cdbm]})\begin{pmatrix} x \\ y \\ z \end{pmatrix} inv^{[cdbm]}$$

designating the inverse matrix of [cdbm].

If one wants to return from the principal axes of inertia to the measuring device marker the following product is done:

$$\begin{pmatrix} x \\ y \\ z \end{pmatrix} = [cdbm]\begin{pmatrix} Xp \\ yp \\ zp \end{pmatrix}.$$

An embodiment of the invention may comprise a correction step. After this transformation, if one examines the recording of the right eye, for example, one sees that the principle axis of inertia is not parallel to the x axis.

This means that the horizontality of the wearer view is lost.

By a simple rotation around the z axis of the principal axes, that horizontality is located. This rotation is directly extractable from the matrix of passage [cdbm].

In fact, the expression of the x axis of the principal axes of inertia in the measuring device axes of origin, which gives the horizontality of the wearer view, is:

$$\begin{bmatrix} cdbm(1,1) & cdbm(1,2) & cdbm(1,3) \\ (cdbm(2,1) & cdbm(2,2) & cdbm(2,3) \\ cdbm(3,1) & cdbm(3,2) & cdbm(3,3) \end{bmatrix} \times \begin{bmatrix} 1 \\ 0 \\ 0 \end{bmatrix} = \begin{bmatrix} cdbm(1,1) \\ cdbm(2,1) \\ cdbm(3,1) \end{bmatrix}$$

And the angle θ of rotation around z is $$\theta = \text{Arc}tg^{\frac{cdbm(2,1)}{cdbm(1,1)}}$$

And the matrix of rotation around z is written:

$$\begin{bmatrix} \cos\Theta & -\sin\Theta & 0 \\ \sin\Theta & \cos\Theta & 0 \\ 0 & 0 & 1 \end{bmatrix} = matrotz$$

In numerical calculation the utilization of the tangent arc is deprecated primarily on a noisy system and around π/2. That's why it is preferable to express the cosine and sine as a function of the terms cdbm(i,j). The matrix of rotation around z is thus written:

$$Matroz = \begin{bmatrix} \frac{cdbm(1,1)}{\sqrt{cdbm(1,1)^2 + cdbm(2,1)^2}} & \frac{-cdbm(2,1)}{\sqrt{cdbm(1,1)^2 + cdbm(2,1)^2}} & 0 \\ \frac{cdbm(2,1)}{\sqrt{cdbm(1,1)^2 + cdbm(2,1)^2}} & \frac{cdbm(1,1)}{\sqrt{cdbm(1,1)^2 + cdbm(2,1)^2}} & 0 \\ 0 & 0 & 1 \end{bmatrix}$$

The coordinates $$(G, xp, yp, zp) = \begin{pmatrix} Xp \\ yp \\ zp \end{pmatrix}$$

expressed in the principal axes then become in the corrected axes:

$$\begin{pmatrix} Xessi \\ Yessi \\ Zessi \end{pmatrix} = [Matroz]_x \begin{pmatrix} Xp \\ Yp \\ Zp \end{pmatrix};$$

And the global matrix of transformation is: [matglob]=[Matrotz]×(inv[cdbm])

Thus the coordinates in the corrected axes, using the measuring device axes recalculated with respect to the gravity center, is written:

$$\begin{pmatrix} Xessi \\ Yessi \\ Zessi \end{pmatrix} = [matglob]_x \begin{pmatrix} X \\ Y \\ Z \end{pmatrix}$$

The origin of the corrected axes being at all times at the centre of gravity of the contour.

Figure 7:
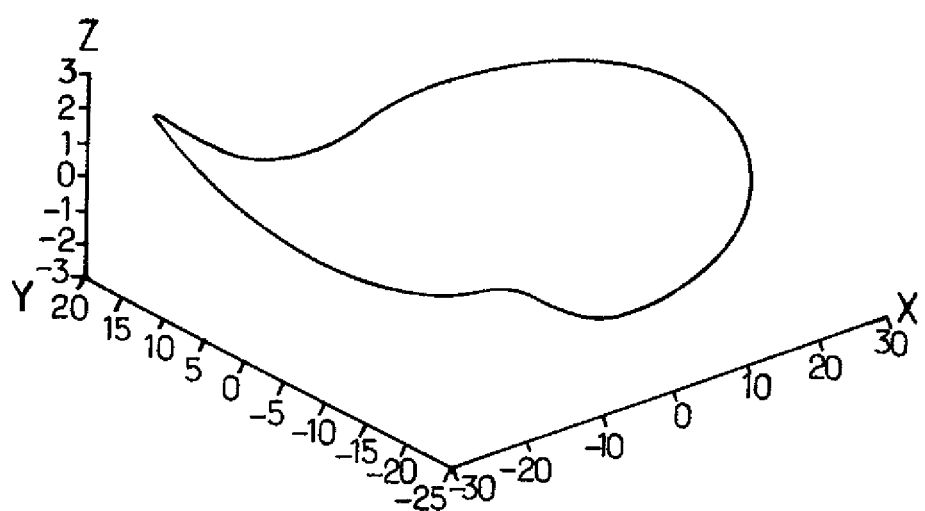

Advantageously, as represented on FIG. 7, the shapes of a rim of a given spectacle frame measured using different measuring devices expressed in the principal axes of inertia of the rim correspond to each other. Therefore, the measured shape of a rim of a spectacle frame can be reliable what ever measuring device is used to measure the rim.

The invention has been described above with the aid of an embodiment without limitation of the general inventive concept; in particular the optimization criteria are not limited to the examples discussed.

The invention claimed is:

1. A method for modifying spectacle frame shape data, comprising the steps of:
   generating spectacle frame data by measuring the shape of a rim of a spectacle frame with a spectacle frame shape measuring apparatus;
   determining the principal axes of inertia of the measured shape of the rim of the spectacle frame using the rim spectacle frame data;
   rotating the X and Y axes of the principal axes of inertia around the Z axis of an angle θ, Z being the axis perpendicular to the average plane of the measured shape of the spectacle frame and $$\text{Arc}tg\left(\frac{X_y}{X_x}\right) - 1 \le \theta \le \text{Arc}tg\left(\frac{X_y}{X_x}\right) + 1$$

with
   $X_x$ being the projection of the axis X of the principal axis of inertia on the x axis of the axis of the measuring apparatus, and
   $X_y$ being the projection of the axis X of the principal axis of inertia on the y axis of the axis of the measuring apparatus; and
   calculating new spectacle rim frame data expressed in the principal axes of inertia of the measured shape of the rim of the spectacle frame.

2. The method according to claim 1, wherein between the step of generating spectacle frame data and the step of determining the principal axes of inertia, the method further comprises a step of sending the spectacle frame data to a spectacle lens manufacturer side using an ordering terminal.

3. The method according to claim 1, wherein between the step of generating spectacle lens data and the step of determining the principal axes of inertia, the method further comprises a step of sending identification data of the spectacle frame shape measuring apparatus to a spectacle lens manufacturer side using an ordering terminal.

4. The method according to claim 1, wherein the spectacle frame data comprises three dimensional data or two dimensional coordinates obtained by projecting the three-dimensional shape of the lens frame onto a plane and parameter values defining a curved surface approximate to the three-dimensional frame shape.

5. The method according to claim 4, wherein the step of expressing said measured shape in its principal axes of inertia is replaced by the step of expressing said measured shape in the corrected axes of inertia.

6. An ophthalmic lens manufacturing method comprising the steps of:
   receiving an ophthalmic lens,
   determining the shape of a given spectacle frame using a method according to claim 1,
   determining the shape of the bevel of the ophthalmic lens so as to have the ophthalmic lens fit in the spectacle frame, and
   cutting the ophthalmic lens according to the calculated bevel.

7. The method according to claim 6, wherein the spectacle frame is selected and measured at a lens order side and the internal profile of the groove of the spectacle lens is transmitted to a computing device installed at a lens edger side where the calculation steps are processed.

8. The method according to claim 6, wherein the cutting step is preceded at the order side.

9. An ophthalmic lens ordering method comprising the steps of:
   selecting a spectacle frame,
   ordering an ophthalmic lens cut according to claim 6, and
   fitting the cut ophthalmic lens in the selected spectacle frame.

10. A non-transitory computer readable medium storing one or more stored sequences of instructions that are accessible to a processor and which, when executed by the processor, cause the processor to carry out the steps of claim 1.

11. A non-transitory computer readable medium storing one or more stored sequences of instructions that are accessible to a processor and which, when executed by the processor, cause the processor to carry out the steps of claim 6.

* * * * *